US012735814B2

(12) United States Patent
Yagi et al.

(10) Patent No.: US 12,735,814 B2

(45) Date of Patent: Sep. 15, 2026

(54) PITCH-BASED ULTRAFINE CARBON FIBERS AND PITCH-BASED ULTRAFINE CARBON FIBER DISPERSION

(71) Applicant: TEIJIN LIMITED, Osaka (JP)

(72) Inventors: Keisuke Yagi, Osaka (JP); Shinya Komura, Osaka (JP); Ryota Hirakawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 737 days.

(21) Appl. No.: 17/908,006

(22) PCT Filed: Mar. 1, 2021

(86) PCT No.: PCT/JP2021/007591

§ 371 (c)(1),
(2) Date: Aug. 30, 2022

(87) PCT Pub. No.: WO2021/177198

PCT Pub. Date: Sep. 10, 2021

(65) Prior Publication Data

US 2023/0086954 A1 Mar. 23, 2023

(30) Foreign Application Priority Data

Mar. 3, 2020 (JP) ................................ 2020-035913

(51) Int. Cl.
*D01F 9/145* (2006.01)
*B82Y 30/00* (2011.01)

(52) U.S. Cl.
CPC .............. *D01F 9/145* (2013.01); *B82Y 30/00* (2013.01)

(58) Field of Classification Search
CPC ...... D01F 9/145; B82Y 30/00; C01P 2002/04; C01P 2004/10; C01P 2004/54; C09D 7/70; C09D 7/61; C01B 32/05; C08K 7/06
See application file for complete search history.

(56) References Cited

U.S. PATENT DOCUMENTS

| | | | |
|---|---|---|---|
| 4,925,547 A | 5/1990 | Tsuchitani et al. | |
| 5,037,590 A | 8/1991 | Fukushima | |
| 5,124,010 A | 6/1992 | Nakao et al. | |
| 5,462,799 A | 10/1995 | Kobayashi et al. | |
| 5,607,490 A | 3/1997 | Taniguchi et al. | |
| 2002/0160266 A1 | 10/2002 | Yamazaki et al. | |
| 2004/0096388 A1 | 5/2004 | Ogale et al. | |
| 2010/0167177 A1 | 7/2010 | Yang et al. | |
| 2018/0175391 A1* | 6/2018 | Komura | D01D 5/36 |
| 2018/0282909 A1* | 10/2018 | Hirakawa | D06M 11/34 |

FOREIGN PATENT DOCUMENTS

| | | | |
|---|---|---|---|
| CN | 102239106 A | | 11/2011 |
| CN | 108026690 A | | 5/2018 |
| EP | 0 402 107 A2 | | 12/1990 |
| JP | 05-302263 A | | 11/1993 |
| JP | 2002-146635 A | | 5/2002 |
| JP | 2006-183173 A | | 7/2006 |
| JP | 2007-177368 A | | 7/2007 |
| JP | 2007-206647 A | | 8/2007 |
| JP | 2008-239468 A | | 10/2008 |
| JP | 2010-024127 A | | 2/2010 |
| JP | 2012-507638 A | | 3/2012 |
| JP | 2015-48561 A | | 3/2015 |
| JP | 6133091 B2 | | 5/2017 |
| JP | 2017-137232 A | | 8/2017 |
| JP | 2017-172099 A | | 9/2017 |
| JP | 2017-210705 A | | 11/2017 |
| JP | 2018141069 A | * | 9/2018 |
| JP | 2019-094603 A | | 6/2019 |
| KR | 10-2013-0100588 A | | 9/2013 |

OTHER PUBLICATIONS

Raymundo-Pinero et al., "Structural characterization of N-containing activated carbon fibers prepared from a low softening point petroleum pitch and a melamine resin" Carbon 40, Apr. 2002, 597-608 (Year: 2002).*

International Search Report of PCT/JP2021/007591 dated Apr. 27, 2021 [PCT/ISA/210].

* cited by examiner

*Primary Examiner* — Anthony J Zimmer
*Assistant Examiner* — Abdul-Rahman Yusuf Waleed Smari
(74) *Attorney, Agent, or Firm* — Sughrue Mion, PLLC

(57) ABSTRACT

The present invention provides pitch-based ultrafine carbon fibers containing nitrogen atoms, wherein the average fiber diameter is more than 100 nm but not more than 900 nm; the content of the nitrogen atoms as determined by X-ray photoelectron spectroscopy (XPS) is 1.00% by atom or less; and the true density is from 1.95 to 2.20 g/cm$^3$.

7 Claims, 1 Drawing Sheet

PITCH-BASED ULTRAFINE CARBON FIBERS AND PITCH-BASED ULTRAFINE CARBON FIBER DISPERSION

CROSS REFERENCE TO RELATED APPLICATIONS

This application is a National Stage of International Application No. PCT/JP2021/007591, filed Mar. 1, 2021, claiming priority to Japanese Patent Application No. 2020-035913, filed Mar. 3, 2020.

TECHNICAL FIELD

The present invention relates to a pitch-based ultrafine carbon fiber and a dispersion including the pitch-based ultrafine carbon fiber.

BACKGROUND ART

Currently, various carbon nanomaterials represented by carbon nanotubes have been developed, and are in the limelight as materials having various functions.

However, carbon nanomaterials are likely to aggregate and usually difficult to disperse in resins and solvents. Therefore, there is a problem that carbon nanomaterials cannot sufficiently exhibit their characteristics, and are prevented from being used in and developed for various applications.

As a method of enhancing the dispersibility of a carbon nanotube in water or the like, for example, Patent Literature 1 describes a method in which a carbon nanotube is subjected to ultrasonic treatment in fuming nitric acid or in a mixed acid of fuming nitric acid and concentrated sulfuric acid at 90° C. for 6 hours to add a nitro group to the carbon nanotube. Patent Literature 2 describes a method for dispersing a carbon nanotube in a polar solvent, in which a mixed acid of nitric acid and sulfuric acid is used to bond a carboxyl group or a phenolic hydroxyl group to the surface of a carbon nanotube.

However, such a method of surface treatment by introducing a functional group has been pointed out to have a problem that a carbon nanotube is cut by excessive oxidation treatment and loses its characteristics as a nanomaterial, and a problem that the dispersibility is poor due to insufficient oxidation treatment. Furthermore, such a method is not preferable from the viewpoints of the complicated process and the working environment.

CITATION LIST

Patent Literature

Patent Literature 1: JP 2010-24127 A
Patent Literature 2: JP 2017-137232 A

SUMMARY OF INVENTION

Technical Problem

In view of the conventional problems described above, an object of the present invention is to provide a pitch-based ultrafine carbon fiber that is easily dispersed in an aqueous solvent and has excellent hydrophilicity. Another object of the present invention is to provide a pitch-based ultrafine carbon fiber dispersion including the pitch-based ultrafine carbon fiber and water.

Solution to Problem

The present inventors have attempted approaches other than surface state modification, such as direct introduction of a functional group into a carbon nanomaterial, in carbon nanomaterials. As a result, the present inventors have found that the affinity for water is improved in a pitch-based ultrafine carbon fiber using mesophase pitch as a raw material if the pitch-based ultrafine carbon fiber includes a small amount of nitrogen atoms derived from a nitrogen oxide, and thus the present invention has been completed.

That is, the present invention is as follows.

[1] A pitch-based ultrafine carbon fiber including a nitrogen atom, the pitch-based ultrafine carbon fiber having an average fiber diameter of more than 100 nm and 900 nm or less, having a content of the nitrogen atom measured by X-ray photoelectron spectroscopy (XPS) of 1.00 atom % or less, and having a true density of 1.95 to 2.20 g/cm$^3$.

[2] The pitch-based ultrafine carbon fiber according to [1], having an average aspect ratio of 30 or more.

[3] The pitch-based ultrafine carbon fiber according to [1] or [2], having a distance between adjacent graphite sheets of 0.3400 nm or more, the distance measured by wide-angle X-ray measurement and represented by d002.

[4] The pitch-based ultrafine carbon fiber according to [1] or [2], having a graphene as a network plane group having a thickness of 30 nm or less, the thickness measured by an X-ray diffraction method and represented by Lc.

[5] A pitch-based ultrafine carbon fiber dispersion containing the pitch-based ultrafine carbon fiber according to [1] and water.

Advantageous Effects of Invention

The pitch-based ultrafine carbon fiber of the present invention includes a nitrogen atom present in a specific amount in the vicinity of the surface, and thus the pitch-based ultrafine carbon fiber has good dispersibility in an aqueous solvent and excellent conductivity although the pitch-based ultrafine carbon fiber is a carbon nanomaterial. Therefore, the pitch-based ultrafine carbon fiber of the present invention is preferably used in fields where the dispersibility and the conductivity are required. For example, the pitch-based ultrafine carbon fiber is useful as a raw material for an aqueous conductive coating material having antistatic performance.

Furthermore, the pitch-based ultrafine carbon fiber of the present invention includes no strong acid such as nitric acid or sulfuric acid, which is used for introducing a functional group, and therefore has a small burden on the environment.

DESCRIPTION OF EMBODIMENTS

Figure 1:
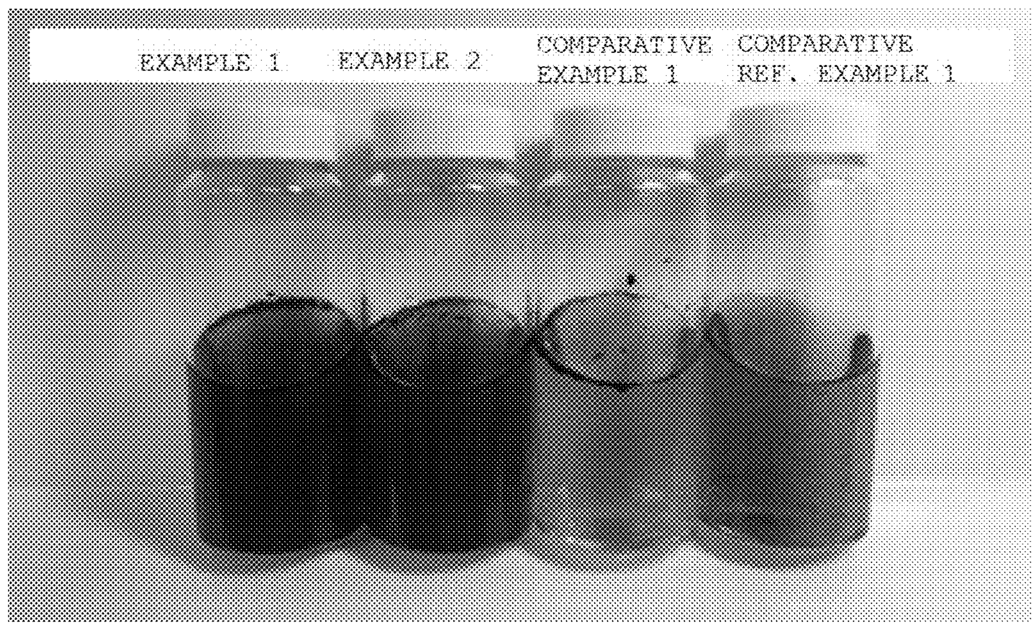
FIG. 1 is a photograph showing evaluation results of the dispersibility of pitch-based ultrafine carbon fibers in an aqueous solvent in Examples and Comparative Examples.
Figure 2:
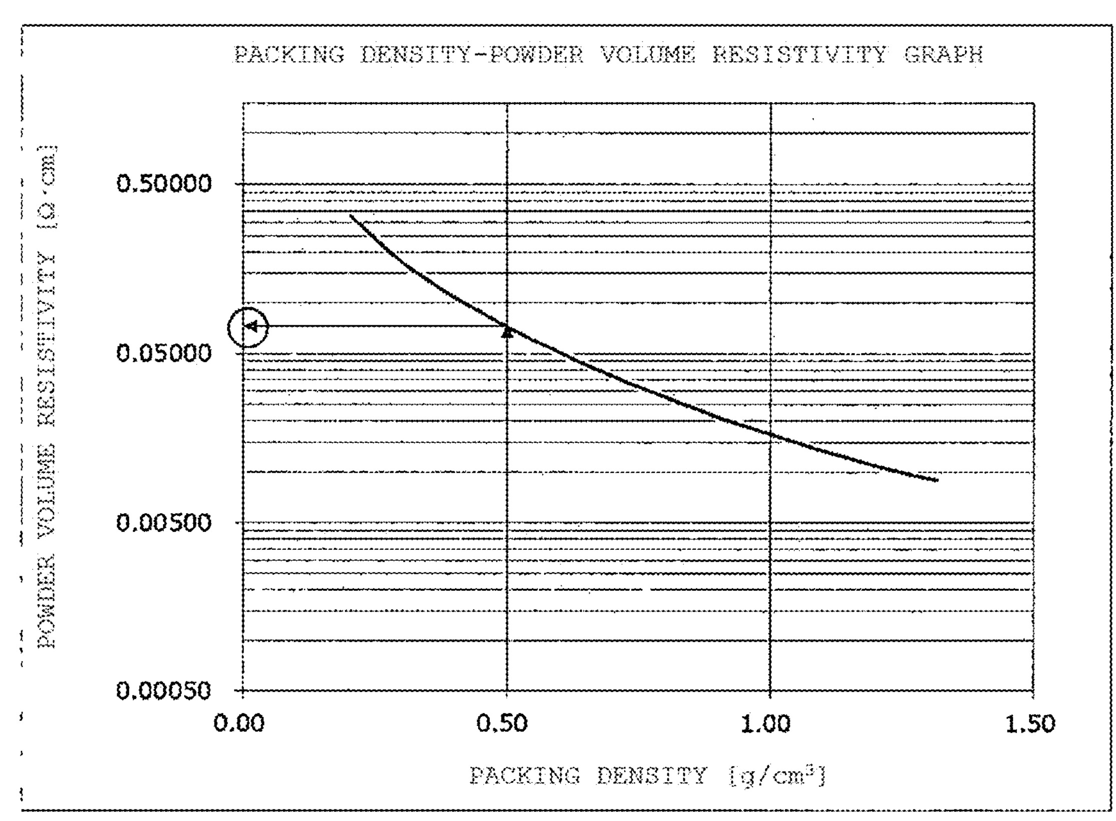
FIG. 2 is a graph showing the relation between the density and the powder volume resistivity in a pitch-based ultrafine carbon fiber of the present invention.

The present invention is a pitch-based ultrafine carbon fiber including at least a nitrogen atom, and the pitch-based ultrafine carbon fiber has an average fiber diameter of more than 100 nm and 900 nm or less, a content of the nitrogen atom measured by X-ray photoelectron spectroscopy (XPS) of 1.00 atom % (atm %) or less, and a true density of 1.95 to 2.20 g/cm$^3$. Here, the term "pitch-based" in the present invention means use of mesophase pitch, as a raw material, that may form an optically anisotropic phase (liquid crystal phase) in a molten state.

(Method for Producing Pitch-Based Ultrafine Carbon Fiber)

The pitch-based ultrafine carbon fiber of the present invention may be produced, for example, with the following method.

That is, the method includes:

(1) a fiberization step of molding a composition containing 100 parts by mass of a thermoplastic resin and 1 to 150 parts by mass of mesophase pitch in a molten state to fiberize the mesophase pitch to obtain a resin composite fiber;

(2) a stabilization step of bringing an oxidizing gas including a nitrogen oxide into contact with the resin composite fiber to stabilize the resin composite fiber and obtain a resin composite stabilized fiber in which nitrogen atoms are introduced into the mesophase pitch during the oxidation reaction;

(3) a thermoplastic resin removing step of removing the thermoplastic resin from the resin composite stabilized fiber to obtain a stabilized fiber; and (4) a heating and firing step of heating the stabilized fiber in an inert atmosphere at 500° C. or higher and lower than 1700° C. to release a part of the nitrogen atoms and obtain a carbon fiber.

First, a mesophase pitch composition is prepared in which mesophase pitch is dispersed in a thermoplastic resin. Examples of the preparation method include a method in which the thermoplastic resin and the mesophase pitch are kneaded in a molten state. The kneading temperature is not particularly limited as long as the thermoplastic resin and the mesophase pitch are in a molten state, but is preferably 100 to 400° C. The thermoplastic resin and the mesophase pitch are kneaded at a kneading ratio such that the amount of the mesophase pitch is usually 1 to 150 parts by mass based on 100 parts by mass of the thermoplastic resin.

Here, examples of the mesophase pitch include those obtained by using a distillation residue of coal or petroleum as a raw material, and those obtained by using an aromatic hydrocarbon such as naphthalene as a raw material. For example, coal-derived mesophase pitch is obtained by treatment mainly including hydrogenation and heat treatment of coal tar pitch, treatment mainly including hydrogenation, heat treatment, and solvent extraction, or the like.

The thermoplastic resin is preferably capable of maintaining its form during stabilization of the mesophase pitch, and is preferably as easy to remove as possible. Examples of such a thermoplastic resin include polyolefins such as polyethylene, polyacrylate-based polymers such as polymethyl methacrylate, and polystyrene.

In order to produce a carbon fiber having a fiber diameter of less than 900 nm, the dispersion diameter of the mesophase pitch in the thermoplastic resin is preferably 0.01 to 50 μm, and more preferably 0.01 to 30 μm. If the dispersion diameter of the mesophase pitch in the thermoplastic resin is out of the range of 0.01 to 50 μm, a desired carbon fiber assembly may be difficult to produce. In the mesophase pitch composition, the mesophase pitch forms a spherical or elliptical island phase. When the island component is spherical, the dispersion diameter in the present invention means the diameter of the spherical island component, and when the island component is elliptical, the dispersion diameter means the major axis diameter of the elliptical island component.

Next, the mesophase pitch composition is melt-spun usually at 150 to 400° C. to obtain a resin composite fiber. As a result, the mesophase pitch composition itself is fiberized, and the mesophase pitch dispersed in the thermoplastic resin included in the mesophase pitch composition is stretched and oriented in the thermoplastic resin to form a fiber. In the resin composite fiber obtained through these steps, the mesophase pitch is microdispersed in a fibrous form in the thermoplastic resin.

Next, the resin composite fiber is stabilized (infusibilized) to obtain a resin composite stabilized fiber. In the present invention, it is important to stabilize (infusibilize) the mesophase pitch by bringing an oxidizing gas containing a nitrogen oxide into contact with the resin composite fiber. At this stage, the mesophase pitch may be infusibilized and nitrogen atoms may be introduced into the mesophase pitch by bringing an oxidizing gas containing a nitrogen oxide into contact with the resin composite fiber. Examples of the nitrogen oxide include nitrogen monoxide, nitrogen dioxide, and dinitrogen tetraoxide. Among them, nitrogen dioxide is preferable from the viewpoints of handleability and stability of the infusibilization reaction. Such an oxidizing gas (reactive gas) containing a nitrogen oxide may be used in combination with air. In the case of using nitrogen dioxide and air in combination, the proportion of nitrogen dioxide is preferably 0.5 to 15 vol % based on the total of air and nitrogen dioxide.

The reaction time in the stabilization is preferably 10 to 1200 minutes. The temperature in the stabilization is usually 50 to 350° C.

In this stabilization step, the nitrogen oxide is incorporated into the surface and/or the inside of the mesophase pitch to obtain a resin composite stabilized fiber. However, details are unclear about the chemical reaction that specifically takes place according to the incorporated nitrogen oxide and about the form of the nitrogen atoms present in the stabilized mesophase pitch.

Subsequently, the thermoplastic resin is removed from the resin composite stabilized fiber to obtain a pitch-based ultrafine carbon fiber precursor. Examples of the method of removing the thermoplastic resin include removal by using a solvent, removal by reduced pressure, and removal by thermal decomposition.

In the case of removal by thermal decomposition, the thermal decomposition temperature is preferably 350 to 600° C., and more preferably 380 to 550° C. If the thermal decomposition temperature is lower than 350° C., thermal decomposition of the stabilized fiber is suppressed, but thermal decomposition of the thermoplastic resin may be insufficient. If the temperature is higher than 600° C., thermal decomposition of the thermoplastic resin may be sufficient, but the stabilized fiber may also be thermally decomposed, and as a result, the yield at the time of carbonization is likely to deteriorate. The thermal decomposition time is preferably 0.1 to 10 hours, and more preferably 0.5 to 10 hours.

Next, the pitch-based ultrafine carbon fiber precursor is heated in an inert gas atmosphere to 500° C. or higher and thus carbonized or graphitized to obtain a pitch-based ultrafine carbon fiber. The heating temperature (firing temperature) in this step is preferably 1000° C. or higher and lower than 1700° C. By setting the heating temperature within such a temperature range, the pitch-based ultrafine carbon fiber of the present invention may be obtained that includes a specific amount of nitrogen atoms derived from the nitrogen oxide used in the stabilization step and has appropriate crystallinity. The heating temperature is preferably higher than 1000° C., more preferably 1200° C. or higher, and still more preferably 1300° C. or higher. If the temperature is lower than 1000° C., carbonization tends to be insufficient. The heating temperature is preferably lower than 1700° C., more preferably 1650° C. or lower, still more preferably 1600° C. or lower, still even more preferably 1550° C. or lower, and particularly preferably 1500° C. or lower. If the temperature is 1700° C. or higher, the affinity of the obtained pitch-based ultrafine carbon fiber for water is insufficient. This is considered to be because substantially all nitrogen atoms are released to the outside of the pitch-based ultrafine carbon fiber by heating to 1700° C. or higher.

The carbonization or graphitization step of the pitch-based ultrafine carbon fiber precursor is preferably performed in an inert gas atmosphere. Examples of the inert gas used here include nitrogen and argon. The oxygen concentration in the inert gas is preferably 20 ppm by volume or less, and more preferably 10 ppm by volume or less. The heating time is preferably 0.1 to 24 hours, and more preferably 0.2 to 10 hours.

(Contents of Nitrogen Atom and the Like)

The pitch-based ultrafine carbon fiber of the present invention includes a nitrogen atom. Including a nitrogen atom means that the content of the nitrogen atom measured by X-ray photoelectron spectroscopy (XPS) is more than 0.00 atom %. The pitch-based ultrafine carbon fiber of the present invention has a nitrogen atom content of 1.00 atom % or less. If the nitrogen atom content is 1.00 atom % or less, the pitch-based ultrafine carbon fiber has high affinity for water and excellent dispersibility in an aqueous solvent. The larger the nitrogen atom content is, the better the dispersibility in an aqueous solvent is. Furthermore, as shown in Examples described below, if the nitrogen atom content is 1.00 atom % or less, the conductivity is less likely to be impaired. The nitrogen atom content is preferably 0.05 to 0.80 atom %, more preferably 0.10 to 0.50 atom %, and still more preferably 0.20 to 0.45 atom %.

The nitrogen atom content may be controlled, for example, by adjusting the firing temperature and the firing time in the carbonization/graphitization step.

It is presumed that the nitrogen atom measured by XPS described above is based on, for example, at least one nitrogen-containing bond in the following structure obtained by reacting the mesophase pitch with a nitrogen oxide in the stabilization step. That is, it is presumed that nitrogen atoms such as pyridine type, pyrrole type, and graphite type nitrogen atoms are present, and that a nitrogen atom of a nitro group is not present. In addition, although not described in the following constituent, the presence of a C═O bond is also observed.

[Chem. 1]

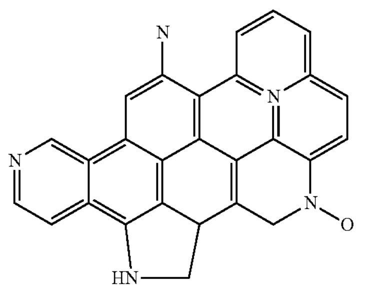

The pitch-based ultrafine carbon fiber of the present invention includes an oxygen atom. The ratio of the oxygen atom content to the nitrogen atom content (O/N) is preferably more than 0 and 20 or less, more preferably 0.05 or more and 15 or less, and still more preferably 0.1 or more and 10 or less. If an oxygen atom is included, the hydrophilicity is improved, but the conductivity tends to be impaired.

(Average Fiber Diameter)

The pitch-based ultrafine carbon fiber of the present invention has an average fiber diameter of more than 100 nm and 900 nm or less. If the average fiber diameter is 100 nm or less, the bulk density is very small, the handleability is poor, and the production process stability is also low. If the average fiber diameter is more than 900 nm, the efficiency of stabilization of the resin composite fiber is reduced to reduce the productivity. The average fiber diameter is preferably 800 nm or less, more preferably 600 nm or less, still more preferably 500 nm or less, still even more preferably 400 nm or less, and particularly preferably 300 nm or less. The average fiber diameter is preferably 110 nm or more, more preferably 120 nm or more, still more preferably 150 nm or more, still even more preferably 200 nm or more, and particularly preferably more than 200 nm.

In the above production method, the average fiber diameter of the pitch-based ultrafine carbon fiber after carbonization or graphitization treatment may be appropriately adjusted by adjusting the dispersion diameter of the mesophase pitch in the mesophase pitch composition, the size of the discharge hole of the spinneret used in melt spinning, drafting, and the like.

Here, the fiber diameter of the pitch-based ultrafine carbon fiber in the present invention means a value measured from a photograph of a section or a surface of the carbon fiber taken using a field emission scanning electron microscope at a magnification of 1000 times. The average fiber diameter of the pitch-based ultrafine carbon fiber is obtained by selecting 500 spots randomly from the obtained electron micrograph, measuring the fiber diameter in each spot, and determining the average of all the measurement results (n=500) as the average fiber diameter.

(True Density)

The pitch-based ultrafine carbon fiber of the present invention has a true density of 1.95 to 2.20 g/cm$^3$. The true density increases as the graphitization of the pitch-based ultrafine carbon fiber develops and the crystallinity increases. If the true density is in the above range, the pitch-based ultrafine carbon fiber has excellent conductivity, and has appropriate crystallinity such that the fiber is relatively flexible without brittleness and is less likely to be broken. The true density is preferably 2.00 g/cm$^3$ or more. The upper limit of the true density is preferably 2.15 g/cm$^3$ or less, more preferably not more than 2.12 g/cm$^3$, and still more preferably 2.10 g/cm$^3$ or less. The true density may be controlled, for example, by adjusting the firing temperature in the carbonization/graphitization step.

(Average Fiber Length)

The pitch-based ultrafine carbon fiber of the present invention preferably has an average fiber length of 5 μm or more and 100 μm or less. If the average fiber length is less than 5 μm the handleability tends to deteriorate. If the average fiber length is more than 100 μm, the dispersibility of each carbon fiber is easily impaired, so that the dispersibility in an aqueous solvent may be low. The average fiber length is more preferably 5 to 50 μm still more preferably 5 to 30 μm, and particularly preferably 10 to 28 μm.

(Average Aspect Ratio)

The pitch-based ultrafine carbon fiber of the present invention preferably has an average aspect ratio, that is, a ratio of the average fiber length (L) to the average fiber diameter (D) (L/D) of 30 or more, more preferably 40 or more, and particularly preferably 50 or more. The upper limit of the average aspect ratio is 1000, preferably 800 or less, and more preferably 500 or less. By setting the average aspect ratio to 30 or more and 1000 or less, the dispersibility in water is improved. If the average aspect ratio is too large, the water dispersibility tends to be low. If the average aspect ratio is too small, the electrostatic attraction is increased, and the fibers tend to be entangled with each other.

The average aspect ratio may be controlled mainly by adjusting the melt spinning conditions of the mesophase pitch composition.

(Conductivity)

The pitch-based ultrafine carbon fiber of the present invention has appropriate conductivity. For example, when the pitch-based ultrafine carbon fiber is filled at a packing density of 0.5 g/$cm^3$, the powder volume resistivity is preferably 0.10 Ω·cm or less, and more preferably 0.08 Ω·cm or less. The lower limit is not particularly limited, but is generally about 0.0001 Ω·cm.

(Crystallinity)

The pitch-based ultrafine carbon fiber of the present invention preferably has a distance between adjacent graphite sheets (d002) measured by wide-angle X-ray measurement of 0.3400 nm or more, more preferably 0.3410 nm or more, still more preferably 0.3420 nm or more, still even more preferably 0.3430 nm or more, and particularly preferably more than 0.3430 nm. From the viewpoint of conductivity, d002 is preferably 0.3470 nm or less, and more preferably 0.3450 nm or less. If d002 is 0.3400 nm or more, the carbon fiber is less likely to be brittle. Therefore, the fiber is less likely to be broken during handling according to the application or during processing (for example, during processing such as forming a slurry in an aqueous solvent), and the fiber length is maintained.

The pitch-based ultrafine carbon fiber of the present invention preferably has a graphene (network plane group) having a thickness (Lc) measured by an X-ray diffraction method of 30 nm or less, more preferably 20 nm or less, and still more preferably 10 nm or less. If the thickness is less than 1.0 nm, the electrical conductivity of the pitch-based ultrafine carbon fiber significantly deteriorates, and therefore such a thickness may be not preferable according to the application. The lower limit is preferably 3 nm from the viewpoint of affinity for water.

In the present invention, the crystallite size (Lc) measured by an X-ray diffraction method refers to a value measured in accordance with Japanese Industrial Standards JIS R 7651 (2007 edition) "Measurement of lattice parameters and crystallite sizes of carbon materials".

The values of d002 and Lc, which are indices of the crystallinity, may be usually adjusted by changing the firing temperature in the carbonization/graphitization step.

(Structure and Form)

The pitch-based ultrafine carbon fiber of the present invention is not particularly limited, but preferably has a linear structure having substantially no branch. The term "having branch" means that the carbon fiber is branched at an intermediate point of its main axis, or the carbon fiber has a main axis having a branched secondary axis. The term "linear structure having substantially no branch" means that the carbon fiber has a branching degree of 0.01 pieces/μm or less. As the carbon fiber having a branched structure, for example, vapor grown carbon fibers (such as VGCF (registered trademark) manufactured by Showadenkosya Co., Ltd.) are known that are produced by a gas phase method in which a hydrocarbon such as benzene is vaporized in a high temperature atmosphere in the presence of a metal such as iron as a catalyst. In VGCF, a metal catalyst usually remains, and VGCF is substantially hollow and has a branched structure.

The pitch-based ultrafine carbon fiber of the present invention has a substantially smooth surface and a solid shape.

Here, the branching degree of the pitch-based ultrafine carbon fiber used in the present invention means a value measured from a photograph taken with a field emission scanning electron microscope at a magnification of 5000 times.

The pitch-based ultrafine carbon fiber of the present invention is to have a fibrous form as a whole, and examples of the pitch-based ultrafine carbon fiber include fibers in which carbon fibers of less than 100 nm are brought into contact with or bonded to each other to integrally form a fiber shape (such as a fiber in which spherical carbon is connected by fusion or the like in a beaded form, and a fiber in which a plurality of extremely short fibers are connected by fusion or the like). Examples of the pitch-based ultrafine carbon fiber further include fibers having a small fiber diameter obtained, for example, by pulverizing carbon fibers having a large fiber diameter more than 900 nm in average fiber diameter.

(Others)

The pitch-based ultrafine carbon fiber of the present invention contains substantially no metal element. The term "substantially no metal element" means that the metal element content is 50 ppm or less in total. In the present invention, the metal element content means the total content of Li, Na, Ti, Mn, Fe, Ni, and Co. In particular, the Fe content is preferably 5 ppm or less, more preferably 3 ppm or less, and still more preferably 1 ppm or less. The pitch-based ultrafine carbon fiber of the present invention contains substantially no metal element, and therefore has no adverse effect due to the presence of a trace amount of metal.

The pitch-based ultrafine carbon fiber of the present invention contains substantially no boron. Here, the term "substantially no boron" means that the boron content is 1 ppm by mass or less. The boron content is preferably less than 0.5 ppm by mass.

(Dispersion)

The pitch-based ultrafine carbon fiber dispersion of the present invention contains the pitch-based ultrafine carbon fiber and water. This carbon fiber has good dispersibility in water. This dispersion may contain a solvent other than water in a state of being dissolved in water, and may contain, for example, a small amount of a surfactant such as carboxymethyl cellulose (CMC) (this solvent is also referred to as an "aqueous solvent").

The pitch-based ultrafine carbon fiber dispersion of the present invention preferably contains 0.0001 to 20 mass % of the pitch-based ultrafine carbon fiber.

EXAMPLES

Hereinafter, the present invention will be more specifically described with reference to Examples, but the present invention is not limited to Examples described below, and may be implemented with appropriate modifications within the scope that may be adapted to the gist of the present invention, and all of the modifications are included in the technical scope of the present invention.

<Analysis Method>

(Confirmation of Shape of Carbon Fiber)

The carbon fiber was observed and photographed using a tabletop electron microscope (model: NeoScope JCM-6000, manufactured by JEOL Ltd.). From the obtained electron micrograph, 500 or more spots were randomly selected, and the fiber diameter was measured in each spot. The average of all the measurement results (n=500 or more) was determined as the average fiber diameter of the carbon fiber.

The fiber length was measured using an image analysis particle size distribution meter (model: IF-200nano, manufactured by JASCO International Co., Ltd.), and the number average fiber length of the carbon fiber assemblies was determined as the average fiber length.

Furthermore, the average aspect ratio was calculated from the average fiber length and the average fiber diameter.

(X-Ray Diffraction Measurement of Carbon Fiber)

In the X-ray diffraction measurement, the lattice spacing (d002) and the crystallite size (Lc) were measured in accordance with JIS R 7651 using RINT-2100 manufactured by Rigaku Corporation.

(X-Ray Photoelectron Spectroscopy (XPS) Analysis)

The contents of nitrogen, carbon, and oxygen were measured using XPS (K-Alpha, manufactured by Thermo Scientific, X-ray source: Al-Kα monochrome (1486.7 eV), X-ray spot size: 200 μm, Flood Gun on, degree of vacuum: $<5\times10^{-8}$ mbar, detection angle: 0 degrees, measurement: element measurement Narrow Scan N1s, C1s, O1s) (unit: atom % (atm %)).

(Method of Measuring True Density)

The true density was measured using gas displacement type ULTRAPYCNOMETER 1000 (manufactured by Quantachrome Instruments) with a helium gas.

(Method of Measuring Powder Volume Resistivity)

The powder volume resistivity was measured using a powder resistivity system MCP-PD51 (manufactured by Dia Instruments Co., Ltd.) under a load of 0.25 to 2.50 kN using a four-probe type electrode unit. The value at a packing density of 0.5 g/cm$^3$ was determined as the volume resistivity.

(Dispersibility in Aqueous Solvent)

Using, as a solvent, water to which 0.25 mass % of carboxymethyl cellulose (CMC) was added, the sample was mixed to a concentration of 0.005 mass %, the resulting mixture was stirred for 1 hour with a mixing rotor at a shaking speed of 80 rpm, and then the dispersibility was visually evaluated. In a case where the sample precipitated, the dispersibility was evaluated as x, and in a case where the dispersion state was maintained, the dispersibility was evaluated as o.

Reference Example 1(Method of Producing Mesophase Pitch)

Coal tar pitch having a softening point of 80° C. from which a quinoline insoluble component was removed was hydrogenated at a pressure of 13 MPa and a temperature of 340° C. in the presence of a Ni—Mo based catalyst to obtain hydrogenated coal tar pitch. The hydrogenated coal tar pitch was heat-treated at 480° C. under normal pressure, and then depressurized to remove a low boiling point component, and thus mesophase pitch was obtained. The mesophase pitch was filtered at a temperature of 340° C. using a filter to remove foreign matters in the pitch, and thus purified mesophase pitch was obtained.

Example 1

Using a co-rotation twin screw extruder ("TEM-26SS" manufactured by Toshiba Machine Co., Ltd., barrel temperature: 300° C., under nitrogen stream), 60 parts by mass of linear low density polyethylene (EXCEED (registered trademark) 1018HA, manufactured by Exxon Mobil Corporation, MFR=1 g/10 min) as a thermoplastic resin and 40 parts by mass of the mesophase pitch (mesophase rate: 90.9%, softening point: 303.5° C.) obtained in Reference Example 1 were melt-kneaded to prepare a mesophase pitch composition.

Next, the mesophase pitch composition was molded into a long fiber shape having a fiber diameter of 90 μm with a melt spinning machine using a circular spinneret having a diameter of 0.2 mm and an introduction angle of 60°. The spinneret temperature was 360° C., the discharge amount per spinning hole was 16.8 g/spinneret/time, and the draft ratio, which is the ratio of the discharge linear speed to the take-up speed, was 5.

A reaction vessel (volume: 33 L) was charged with 1.25 kg of the resin composite fiber, and a mixed gas of air and nitrogen dioxide (having a proportion of nitrogen dioxide of 13 vol % based on the total of nitrogen dioxide and air) was introduced into the system in the reaction vessel at 1.2 L/min at room temperature over 300 minutes. Thus, the mesophase pitch was stabilized to obtain a resin composite stabilized fiber.

Next, in a vacuum gas replacement furnace, nitrogen replacement was performed, and then the resin composite stabilized fiber was depressurized to 1 kPa, heated to 500° C. at a temperature rise rate of 5° C./min under the depressurized state, and held at 500° C. for 1 hour to remove the thermoplastic resin and obtain a pitch-based ultrafine carbon fiber precursor.

Next, in the vacuum gas replacement furnace, the pitch-based ultrafine carbon fiber precursor was heated to 1000° C. at 5° C./min under a flow of a nitrogen gas, heat-treated at the same temperature for 0.5 hours, and then further heat-treated in an argon gas atmosphere under a graphitization condition of 1300° C. for 0.5 hours to obtain a carbon fiber assembly.

The carbon fiber assembly was subjected to crushing treatment using a dry jet mill to obtain a pitch-based ultrafine carbon fiber. The carbon fiber had an average fiber diameter of 300 nm, an average fiber length of 15 μm and an average aspect ratio of 50. A branched structure was not observed.

The nitrogen content, the true density, the volume resistivity, d002, and Lc of the obtained pitch-based ultrafine carbon fiber were measured. Table 1 shows the results.

FIG. 1 shows the evaluation results of the water dispersibility.

Example 2

A pitch-based ultrafine carbon fiber was obtained in the same manner as in Example 1 except that the graphitization temperature was 1500° C. Table 1 and FIG. 1 show the results. The carbon fiber had an average fiber diameter of 300 nm, an average fiber length of 15 μm, and an average aspect ratio of 50. A branched structure was not observed.

Comparative Example 1

A pitch-based ultrafine carbon fiber was obtained in the same manner as in Example 1 except that the graphitization temperature was 1700° C. Table 1 and FIG. 1 show the results. The carbon fiber had an average fiber diameter of 300 nm, an average fiber length of 15 μm, and an average aspect ratio of 50. A branched structure was not observed.

Comparative Example 2

A pitch-based ultrafine carbon fiber was obtained in the same manner as in Example 1 except that the graphitization temperature was 1000° C. Table 1 shows the results. The carbon fiber had an average fiber diameter of 300 nm, an average fiber length of 15 μm, and an average aspect ratio of 50. A branched structure was not observed.

Comparative Example 3

A pitch-based ultrafine carbon fiber was obtained in the same manner as in Example 1 except that the graphitization temperature was 3000° C. Table 1 shows the results. The carbon fiber had an average fiber diameter of 300 nm, an average fiber length of 15 μm, and an average aspect ratio of 50. A branched structure was not observed. Although not shown, the dispersibility was evaluated as x as in Comparative Example 1.

Comparative Reference Example 1

In Comparative Reference Example 1, vapor grown carbon fiber (VGCF (registered trademark): Vapor Growth Carbon Fiber) was used as a carbon material instead of the pitch-based ultrafine carbon fiber of Example 1. The carbon fiber had an average fiber diameter of 150 nm, an average fiber length of 7.5 μm, and an average aspect ratio of 50. The carbon fiber had a branched structure. Table 1 and FIG. 1 show the results.

TABLE 1

| | Firing | X-ray photoelectron spectroscopy (XPS) analysis | | | Volume | True | | | Dispersibility |
|---|---|---|---|---|---|---|---|---|---|
| | temperature (° C.) | C (atm %) | O (atm %) | N (atm %) | resistivity (Ω · cm) | density (g/cm$^3$) | d002 (nm) | Lc (nm) | in aqueous solvent |
| Example 1 | 1300 | 97.9 | 1.6 | 0.50 | 0.07 | 2.04 | 0.345 | 3.7 | ○ |
| Example 2 | 1500 | 98.4 | 1.3 | 0.27 | 0.06 | 2.10 | 0.344 | 5.3 | ○ |
| Comparative Example 1 | 1700 | 98.7 | 1.3 | 0.00 | 0.07 | 2.12 | 0.343 | 10.1 | x |
| Comparative Example 2 | 1000 | 96.4 | 2.5 | 1.10 | 0.12 | 1.94 | 0.343 | Unmeasured | ○ |
| Comparative Example 3 | 3000 | 98.9 | 1.1 | 0.00 | 0.05 | 2.22 | 0.337 | 90.0 | x |
| Comparative Reference Example 1 | — | 98.6 | 1.4 | 0.00 | 0.06 | 2.14 | 0.338 | 27.5 | x |

(Results)

As can be seen from Table 1, in cases where graphitization treatment was performed at firing temperatures of 1300° C. and 1500° C. as shown in Examples 1 and 2, the carbon fiber included nitrogen atoms within the range of 0.27 to 0.50 atm % that were derived from the nitrogen oxide used in the infusibilization reaction.

As can be seen from Table 1, the true density in Examples 1 and 2 was 2.04 to 2.10 g/cm$^3$, and was lower than that of the carbon material including no nitrogen atom (in Comparative Example 1, Comparative Example 3, and Comparative Reference Example 1). However, the volume resistivity showed almost the same level regardless of the nitrogen atom content. Furthermore, the conductivity was good in spite of the low crystallinity.

As shown in FIG. 1, it is found that the carbon fibers of Example 1 and Example 2 are more excellent in dispersibility in an aqueous solvent than the carbon fiber of Comparative Example 1.

In Comparative Example 2, the carbon fiber included 1.10 atm % of nitrogen atoms, and had excellent dispersibility in an aqueous solvent, but had a high volume resistivity value and low conductivity.

The invention claimed is:

1. A pitch-based ultrafine carbon fiber comprising a nitrogen atom, the pitch-based ultrafine carbon fiber having an average fiber diameter of more than 100 nm and 900 nm or less, having a content of the nitrogen atom measured by X-ray photoelectron spectroscopy (XPS) of 0.05 to 1.00 atom %, and having a true density of 1.95 to 2.20 g/cm$^3$.

2. The pitch-based ultrafine carbon fiber according to claim 1, wherein the average aspect ratio is 30 or more.

3. The pitch-based ultrafine carbon fiber according to claim 1, wherein a distance between adjacent graphite sheets, represented by d002, as measured by wide-angle X-ray measurement, is 0.3400 nm or more.

4. The pitch-based ultrafine carbon fiber according to claim 1, wherein a thickness of graphene as a network plane group, represented by Lc, as measured by an X-ray diffraction method, is 30 nm or less.

5. A pitch-based ultrafine carbon fiber dispersion comprising the pitch-based ultrafine carbon fiber according to claim 1 and water.

6. The pitch-based ultrafine carbon fiber according to claim 2, wherein a distance between adjacent graphite sheets, represented by d002, as measured by wide-angle X-ray measurement, is 0.3400 nm or more.

7. The pitch-based ultrafine carbon fiber according to claim 2, wherein a thickness of graphene as a network plane group, represented by Lc, as measured by an X-ray diffraction method, is 30 nm or less.

* * * * *